US012679318B2

(12) United States Patent
Hayes et al.

(10) Patent No.: US 12,679,318 B2
(45) Date of Patent: Jul. 14, 2026

(54) SYSTEM AND METHOD FOR USING A PNEUMATIC LINE AS A BACKUP COMMUNICATION CHANNEL FOR FIRST AND SECOND PARK BRAKE CONTROLLERS

(71) Applicant: Bendix Commercial Vehicle Systems LLC, Avon, OH (US)

(72) Inventors: Thomas J. Hayes, Lakewood, OH (US); Christopher H. Hutchins, Bay Village, OH (US); Niket Mokashi, Maharashtra (IN); Vishawajeet More, Maharashtra (IN)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 511 days.

(21) Appl. No.: 18/225,293

(22) Filed: Jul. 24, 2023

(65) Prior Publication Data

US 2025/0033616 A1     Jan. 30, 2025

(51) Int. Cl.
B60T 8/94 (2006.01)
B60T 8/17 (2006.01)
(Continued)

(52) U.S. Cl.
CPC .............. B60T 8/94 (2013.01); B60T 8/1708 (2013.01); B60T 13/683 (2013.01); B60T 17/22 (2013.01); B60T 2250/04 (2013.01); B60T 2270/402 (2013.01); B60T 2270/413 (2013.01); B60T 2270/88 (2013.01)

(58) Field of Classification Search
CPC ........ B60T 8/94; B60T 8/1708; B60T 13/683;
B60T 17/22; B60T 2250/04; B60T 2270/402; B60T 2270/413; B60T 2270/88; B60T 17/221

See application file for complete search history.

(56) References Cited

U.S. PATENT DOCUMENTS 11,407,394 B2 * 8/2022 Hutchins .............. F16H 63/486
2021/0122343 A1 4/2021 Mehdizade et al.
(Continued)

FOREIGN PATENT DOCUMENTS

EP     3 507 153 B1     4/2020
EP     3 663 150 A1     6/2020
EP     3 828 054 B1     6/2023

OTHER PUBLICATIONS

Chinese Patent No. CN 106627555 to Meng et al published on May 10, 2017.*

(Continued)

*Primary Examiner* — Pamela Rodriguez
(74) *Attorney, Agent, or Firm* — Crowell & Moring LLP

(57) ABSTRACT

A system and method are provided for using a pneumatic line as a backup communication channel for first and secondary park brake controllers. In one embodiment, a park brake system is provided comprising a first park brake controller and a second park brake controller. The first park brake controller is configured to selectively alter air pressure in an air line of a vehicle to pneumatically communicate a message to the second park brake controller after a loss of electronic communication with the second park brake controller. Other embodiments are provided.

20 Claims, 3 Drawing Sheets

(51) Int. Cl.
  B60T 13/68    (2006.01)
  B60T 17/22    (2006.01)

(56)     References Cited

U.S. PATENT DOCUMENTS

| | | | |
|---|---|---|---|
| 2021/0170999 A1* | 6/2021 | Hutchins | B60T 7/12 |
| 2022/0402470 A1 | 12/2022 | Toth et al. | |
| 2024/0343241 A1* | 10/2024 | Hayes | B60T 13/66 |
| 2025/0074373 A1* | 3/2025 | Hayes | B60T 13/385 |

OTHER PUBLICATIONS

International Search Report mailed Dec. 6, 2024 for International Application No. PCT/US2024/035231.
Written Opinion mailed Dec. 6, 2024 for International Application No. PCT/US2024/035231.

\* cited by examiner

SYSTEM AND METHOD FOR USING A PNEUMATIC LINE AS A BACKUP COMMUNICATION CHANNEL FOR FIRST AND SECOND PARK BRAKE CONTROLLERS

BACKGROUND

In some vehicles (e.g., a tractor capable of towing a trailer), when park brakes of the vehicle are applied, a park brake controller provides a signal to a park brake valve to exhaust air in one or more spring brake chambers, which causes park brake springs to apply the vehicle's park brake. To release the park brake, the park brake controller causes compressed air to flow into the spring brake chambers to apply pneumatic pressure to the park brake springs to release them from the braking position.

SUMMARY

The following embodiments generally relate to a system and method for using a pneumatic line as a backup communication channel for first and second park brake controllers. In one embodiment, a park brake system is provided comprising a first park brake controller and a second park brake controller. The first park brake controller is configured to selectively alter air pressure in an air line of a vehicle to pneumatically communicate a message to the second park brake controller after a loss of electronic communication with the second park brake controller.

In another embodiment, a method is provided that is performed in a park brake system of a vehicle comprising first and second park brakes controllers. In this method, the second park brake controller attempts to park the vehicle in response to detecting a loss of electronic communication between the first and second park brakes controllers. The first brake controller determines whether the second park brake controller was successful in parking the vehicle prior to a first countdown timer elapsing, and in response to determining that the second park brakes controller was not successful, pneumatically communicates a message to the second park brake controller to indicate that a second countdown timer has started.

In yet another embodiment, a park brake system is provided comprising a first park brake controller, a second park brake controller, and means for pneumatically communicating a message between the first and second park brake controllers in response to a loss of electronic communication between the first and second park brake controllers.

Other embodiments are possible, and each of the embodiments can be used alone or together in combination.

DETAILED DESCRIPTION

Figure 1:
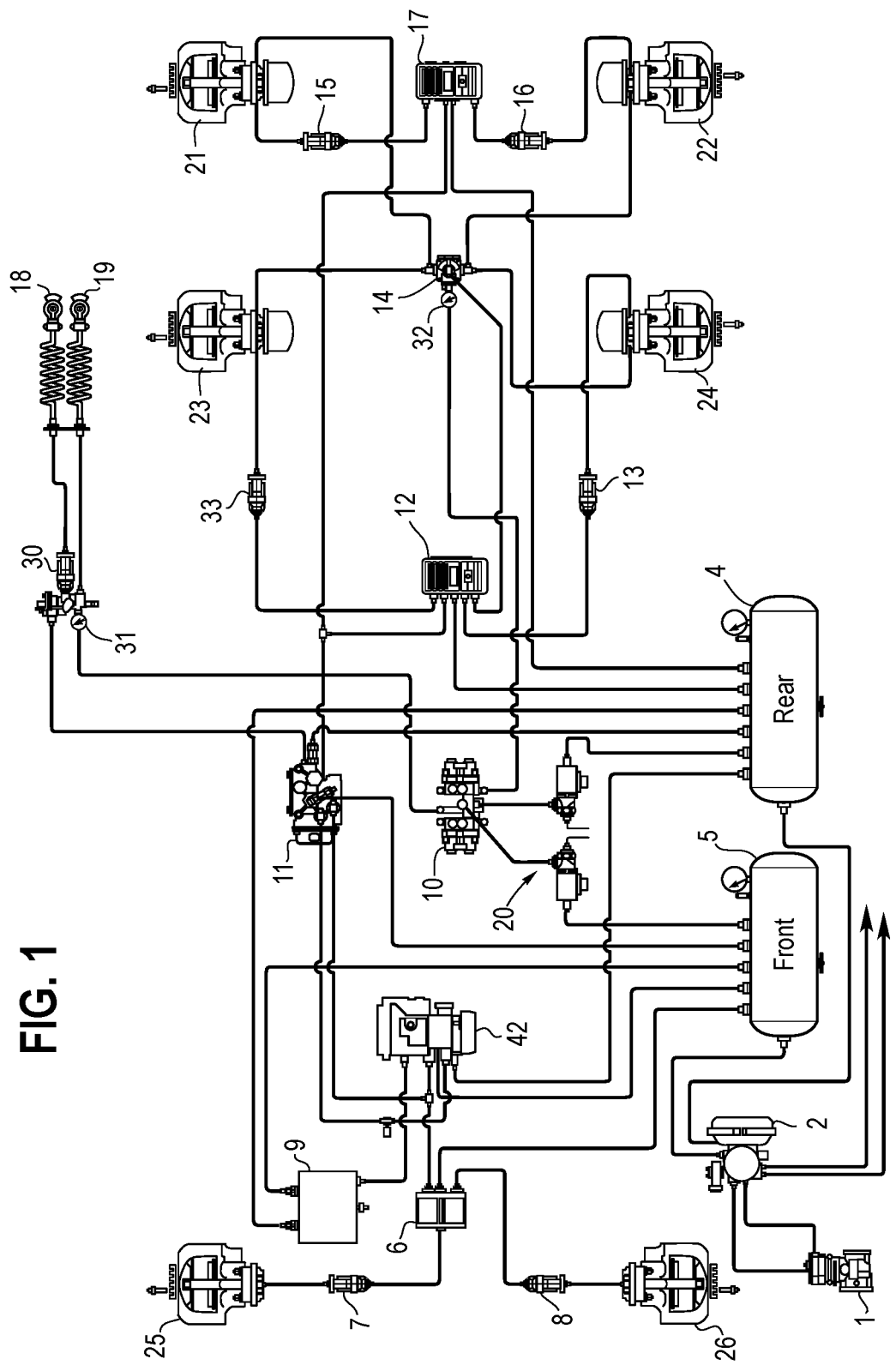
FIG. 1 is a pneumatic diagram of a brake system of a vehicle of an embodiment.

FIG. 1 is a pneumatic diagram of a brake system of an embodiment for use in a vehicle (e.g., a tractor or truck) that is capable of towing a trailer. It should be understood that this is merely an example and that other/different components can be used. In this example, the tractor has a rear drive axle, a front undriven (steer) axle (more than one steer axle can be used), and one or more optional axles. It is important to note that while a tractor/truck is used in this example, these embodiments can also be applied in other vehicles.

As shown in FIG. 1, in this embodiment, the brake system comprises an air compressor 1, an air dryer 2, and rear and front air tanks 4, 5. The air compressor 1 provides compressed air to the air dryer 2, which supplies dried, compressed air to the rear and front air tanks 4, 5, which supply compressed air to the service brakes and the parking brakes, as discussed below. Compressed air can also be supplied to the transmission and accessories of the vehicle, as represented by the two arrows at the bottom of FIG. 1.

Other components of the brake system of this embodiment include electro-pneumatic modules (EPMs) 6, 12, 17; modulators 7, 8, 13, 15, 16, 33; a brake booster 9; a park valve modulator 10 having as associated first park brake controller (not shown) with two pressure sensors; an electronic trailer controller module 11; a quick release valve 14; pneumatic control and supply lines 18, 19 configured to connect to a trailer; a second valve control 20 having an associated park brake controller (not shown); air disc brakes 21, 22, 23, 24, 25, 26; a tractor protection valve 30; pressure sensors 31, 32; and foot brake module (FBM) 42.

As mentioned above, the brake system of this embodiment can be used for service braking and parking the vehicle. In general, for service braking, when a driver presses the brake pedal of the FBM 42 or when a virtual driver requests braking, electronic signals representing the requested deceleration are sent to the EPMs 6, 12, 17 to apply the appropriate amount of pressure needed to achieve that deceleration given various variables, such as, but not limited to, vehicle weight, weight distribution, whether a trailer is present, and driving conditions. In an electronic braking system (EBS), relays and modulators on an axle can be combined into an EPM, which is capable of electronically applying, holding, and releasing air supplied from the front and rear tanks 3, 4 to decelerate a wheel end of the axles. Pneumatic signals for braking can be applied to the trailer via the pneumatic control and supply lines 18, 19.

The first park brake controller (sometimes referred to herein as the first controller or the first electronic parking brake (pEPB)) and the second park brake controller (sometimes referred to herein as the second controller or the second electronic control unit (rECU)) are used in parking/un-parking the vehicle. In general, a "controller" can comprise one or more processors that can execute computer-readable program code having instructions (e.g., modules, routines, sub-routine, programs, applications, etc.) that, when executed by the one or more processors, cause the one or more processors to perform certain functions, such as some or all of those discussed herein. The computer-readable program code can be stored in a non-transitory computer-readable storage medium, such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof, some or all of which can be located internal to or external to the controller. The one or more processors can also take the form of a purely-hardware implementation (e.g., an application-specific integrated circuit (ASIC)).

In this embodiment, park brake springs are used that are biased to apply pressure on braking components at the wheel ends. When the park brakes of the vehicle are applied, the first park brake controller provides signals to the park brake valves to exhaust air in one or more spring brake chambers. When air in the spring brake chambers is exhausted or the system air pressure drops below a threshold (e.g., to less than about 25 psi to 45 psi), the park brake springs are activated to apply the vehicle park brake.

The first park brake controller can provide a signal to control the parking brake valve in response to a (human or virtual) driver demand to un-park the vehicle (e.g., when a human driver pushes a park/un-park button in the vehicle). To release the park brake, compressed air needs to flow from the rear or front tanks 4, 5 into the spring brake chambers to apply pneumatic pressure to the parking brake springs to release them from the braking position. The supply of compressed air from the rear or front tanks 4, 5 to the spring brake chambers to release the parking brake is regulated by a parking brake valve (e.g., the park valve modulator 10) that is controlled by the first park brake controller.

The second park brake controller is used in case there is a malfunction or other problem that prevents the first park brake controller from working correctly to exhaust air in the spring brake chambers to activate the park brake springs to park the vehicle. More specifically, in this embodiment, the second park brake controller comprises at least one processor and solenoid valve(s). When the at least one processor in the second park brake controller detects or is informed of a problem with the first park brake controller, the second park brake controller can close the solenoid valve(s) to starve the air supply of the park valve modulator 10, isolating it from the air tanks 3, 4, exhausting the remaining pressure in the park brake system, and applying the park brake. Also, instead of the first parking brake system un-parking the vehicle and the second system parking the vehicle, in another embodiment, the first park brake system parks/un-parks the vehicle, and the second system only parks (and does not un-park) the vehicle.

Figure 2:
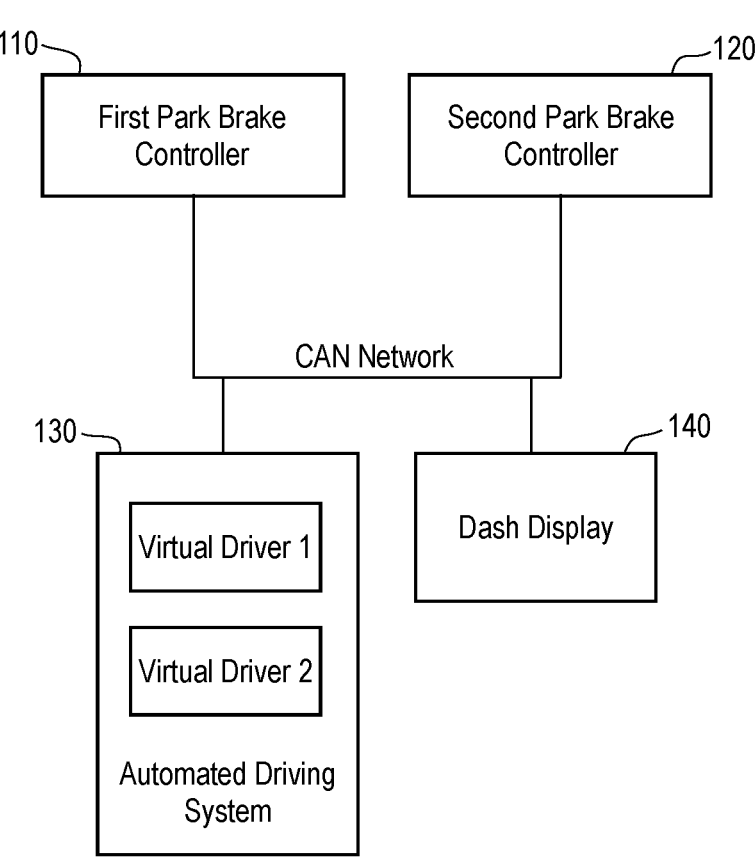
FIG. 2 is a block diagram of a communications network of a vehicle of an embodiment.

As shown in FIG. 2, the first and second park brake controllers 110, 120 can communicate with each other via a controller area network (CAN). While not shown in FIG. 2 to simplify the drawings, second communication lines can be used. Also, it should be noted that while a CAN is used in this example, any suitable communications mechanism, wired or wireless, can be used. In this embodiment, the first and second park brake controllers 110, 120 also communicate with other components in the vehicle, such as an automated driving system 130 and a dash display 140. The dash display 140 can provide audio and/or visual information to a human driver or occupant of the vehicle. The automated driving system 130 comprises one or more processors that can execute computer-readable program code to provide fully automatic or partially automatic control over the acceleration, steering, and/or braking of the vehicle. As used herein, a "virtual driver" refers to an instantiation of a computer mechanism for providing such control. The automated driving system 130 can also be implemented exclusively with hardware (e.g., an ASIC). In this embodiment, the automated driving system 130 contains two virtual drivers (first and second) for redundancy. In other embodiments, one virtual driver is used or more than two virtual drivers are used.

The first and second park brake controllers 110, 120 can read air pressure readings from their respective pressure sensor(s). In one embodiment, the pressure sensors for the first and second park brake controllers 110, 120 are on the same air lines (e.g., hoses or, more generally, air channels) and are relatively close to each other. In this example, the first brake controller 110 has pressure sensors built-in to its output ports connected to air lines that provide control air to the tractor's and trailer's park brakes, and the second brake controller 110 uses pressure sensors 31, 32 at distal outputs of air circuits operated by the air lines. Of course, this is just an example, and other configurations can be used.

As mentioned above, the first and second park brake controllers 110, 120 use (wired or wireless) electronic signals to communicate high levels of information to each other (e.g., via a network, such as a CAN, a local interconnect network (LIN), Ethernet, etc., or as wireless signals, for example). If these signals stop functioning due to connection issues, bus issues, damage to electrical wires, or transceivers, the communication medium will lose its ability to communicate signals between the first and second park brake controllers 110, 120. Without the electronic communication medium to communicate, the first and second park brake controllers 110, 120 are not able to communicate critical and other information. The following embodiments provide for the use of a pneumatic line as a backup (or "last resort") communication channel between the first and second park brake controllers 110, 120 in the event that electronic communication is not available between the controllers 110, 120.

As mentioned above, in this example, the first park brake controller 110 controls a first (e.g., solenoid) valve (e.g., the park valve modulator 10) that controls a supply of air to a park brake of the vehicle, and the second park brake controller 120 controls a second (e.g., solenoid) valve (e.g., the second valve 20) that controls a supply of air to the first valve. Each of the first and second park brake controllers 110, 120 receive pressure readings from a set of one or more sensors in the air line controlled by the first and second park brake controllers 110, 120.

In one embodiment, the sets of pressure sensors are along an air flow to one of a tractor park brake and a trailer park brake (an additional set of pressure sensors can be used along an air flow to the other one of the tractor park brake and a trailer park brake). Also, the first and secondary park brake controllers can be in a single brake circuit, with no park brake circuit for the trailer. That is, the whole vehicle has a single brake circuit, which can be the case, for example, for certain tractor/trailers in some European and other countries, certain trucks without trailers, and certain school busses. In this embodiment of a single park brake circuit, there can be a total of two pressure sensors-one in the first park brake controller, and another in the second controller.

In this embodiment, the first park brake controller 110 is configured to selectively alter air pressure in the air line to pneumatically communicate a message to the second park brake controller 120 (e.g., after a loss of electronic communication with the second park brake controller 120). With the relatively-long distance from the control solenoids to the wheel ends, it is possible for small and quick actuations of the solenoids that control these air lines to be used for communication without affecting the wheel end torque. The second park brake controller 120 is configured to recognize changes in detected air pressure in the air line as a message. For example, the second park brake controller 120 can store a table of one or more air pressure patterns (e.g., on-off-on-off, on-off-off-on, etc.) and corresponding messages. Also, it should be noted that instead of or in addition to the first brake controller 110 sending a pneumatic message to the second brake controller 120, the second brake controller 120 can send a pneumatic message to the first brake controller 110. Also, while a pneumatic message is sent in this example in response to an inability of the first and second brake controllers 110, 120 to electronically communicate, in another example, a pneumatic message can be sent even if the first and second brake controllers 110, 120 are able to electronically communicate.

As mentioned above, the second park brake controller 120 is configured to recognize changes in detected air pressure in the air line as a message. The message can take any suitable form. For example, in one embodiment, the message is sent during a process to park the vehicle and informs the second park brake controller 120 that a second countdown timer has started. This example will be now discussed in conjunction with the flow chart 300 of FIG. 3. It is important to note that the details presented herein are just examples and should not be read into the claims unless expressly recited therein.

Figure 3:
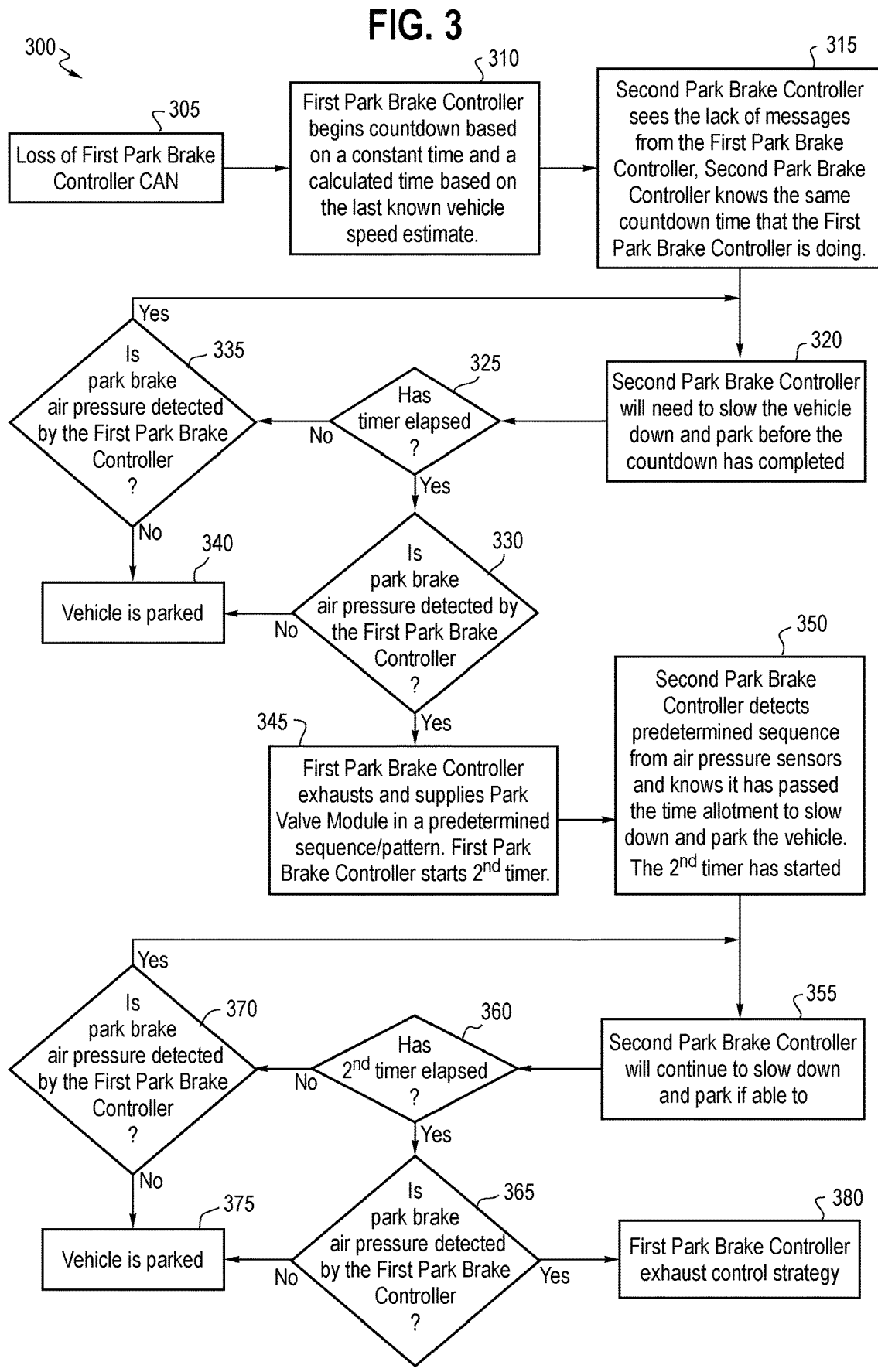
FIG. 3 is a flow chart of a method of an embodiment for using a pneumatic line as a backup communication channel for first and second park brake controllers.

As shown in FIG. 3, in this example, the first brake controller 110 detects a loss of electronic communication with the second brake controller 120 (act 305). This can occur, for example, when the first brake controller 110 detects a loss of some or all expected electronic signals from the second brake controller 120 and/or another component in the communications network. Next, the first brake controller 110 starts a countdown timer (act 310). The amount of time on the countdown timer can be a predetermined amount of time or can be dynamically determined based on one or more factors, such as, but not limited to, the last-known actual speed (or speed estimate) of the vehicle plus an optional time constant. In this example, the second brake controller 120 is also able to detect a loss of electronic communication with the first brake controller 110 and would know that that first brake controller 110 started its countdown timer (act 315).

At that point, the second brake controller 120 will attempt to slow down and park the vehicle before the countdown time expires (act 320). For example, the second brake controller 120 can attempt to apply the service brakes to bring the vehicle to a stop and then exhaust the air in the spring brakes to park the vehicle. Before the countdown clock expires (act 325), the first brake controller 110 determines if park brake air is detected, which would mean that the parking brakes have not yet been applied (act 335). If park brake air is not detected, the first brake controller 110 concludes that the vehicle is parked, and the method ends (act 340). This process of checking for the presence of park brake air continues until the countdown clock expires, as which time the first park brake controller 110 does one final check (act 330). If the first brake controller 110 determines that park brake air is not detected, the first brake controller 110 concludes that the vehicle is parked, and the method ends (act 340).

However, if the first park brake controller 110 detects park brake air (which indicates that the vehicle is still not parked), the first park brake controller 110 sends a pneumatic signal (e.g., by exhausting and supplying air to the park valve modulator in a predetermined sequence or pattern) and also starts another countdown clock (with the same or different time used for the first countdown clock) (act 345). The second park brake controller 120 is programmed to recognize this pattern (optionally, among other patterns) and know that the first countdown timer has expired and that the second countdown timer has begun (act 350). In this example, the first countdown timer serves as a "first warning" to the second park brake controller 120 that it should take action to slow down and park the vehicle. The second countdown timer is the "final warning" that if the vehicle is not parked by the expiration of the second countdown clock, the first brake controller 110 will take matters in its own hands and park the vehicle (e.g., "no matter what").

So, as before, the second brake controller 120 can attempt to apply the service brakes to bring the vehicle to a stop and then exhaust the air in the spring brakes to park the vehicle (act 355). Before the second countdown timer expires (act 360), the first brake controller 110 determines if park brake air is detected, which would mean that the parking brakes have not yet been applied (act 370). If park brake air is not detected, the first brake controller 110 concludes that the vehicle is parked, and the method ends (act 375). This process of checking for the presence of park brake air continues until the second countdown timer expires, as which time the first park brake controller 110 does one final check (act 365). If park brake air is not detected, the first brake controller 110 concludes that the vehicle is parked, and the method ends (act 375). If the vehicle is not parked, the first park brake controller 110 executes an exhaust control strategy (e.g., parks the vehicle) (act 380).

In summary, in this example, upon the loss of communication, the first park brake controller 110 starts a countdown based on last-known vehicle dynamics. The second park brake controller 120 can also start a countdown or begin to perform a task based on the loss of communication to the first park brake controller 110. Upon the completion of the first park brake controller's timer, the first park brake controller 110 can check for air pressure status to see if the second park brake controller 120 performed any tasks during the countdown. The first park brake controller 110 can pulse control solenoid(s) in a predefined pattern allowing the second park brake controller 120 to monitor and register a pressure change on the shared air line (without affecting any wheel end torque), allowing the second park brake controller 120 to acknowledge that a first timer has passed. After this predefined pattern is complete, the first park brake controller 110 begins a second shorter timer where it will park the vehicle at the completion of the timer. As the second park brake controller 120 monitors the air lines for the predetermined pattern, it knows the second timer has begun, and it should take action to bring the vehicle to a halt before the park brake is set. If capable, the second park brake controller 120 will pulse its solenoids to communicate back to the first park brake controller 110 an acknowledgment or a different control decision.

As noted above, many alternatives can be used. For example, a predefined pattern of pressure changes can trigger any suitable action/event by the first park brake controller 110 or by the second park brake controller 120 (in addition to or instead of the actions discussed above). Also, the trigger for the transmission of the pattern can be a loss of electronic communication between the first park brake controller 110 and the secondary park brake controller 120, or it can be some other triggering event.

Also, if the first brake controller 110 loses its communication (e.g., CAN) connection, it may not be able to obtain information about the vehicle speed. However, the second brake controller 120 can have a direct connection to the wheel speed information and can know the speed of the vehicle even if the CAN is lost.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A park brake system comprising:
a first park brake controller; and
a second park brake controller;
wherein the first park brake controller is configured to selectively alter air pressure in an air line of a vehicle to pneumatically communicate a message to the second park brake controller after a loss of electronic communication with the second park brake controller.

2. The park brake system of claim 1, further comprising:
at least one pressure sensor coupled with the second park brake controller and configured to detect air pressure in the air line;
wherein the second park brake controller is configured to recognize changes in detected air pressure in the air line as the message.

3. The park brake system of claim 1, further comprising:
at least one pressure sensor coupled with the first park brake controller and configured to detect air pressure in the air line;
wherein:
the second park brake controller is configured to selectively alter air pressure in the air line to pneumatically communicate a second message to the first park brake controller; and
the first park brake controller is configured to recognize changes in detected air pressure in the air line as the second message.

4. The park brake system of claim 1, wherein:
the second park brake controller is configured to attempt to park the vehicle in response to the second park brake controller detecting the loss of electronic communication; and
the first park brake controller is further configured to pneumatically communicate the message in response to the second park brake controller not being able to park the vehicle after an amount of time after the first park brake controller detects the loss of electronic communication.

5. The park brake system of claim 4, wherein the amount of time is based on a speed of the vehicle.

6. The park brake system of claim 5, wherein the amount of time is also based on a time constant.

7. The park brake system of claim 4, wherein the first park brake controller is further configured to park the vehicle in response to the vehicle not being parked after a second amount of time after the first park brake controller pneumatically communicates the message.

8. The park brake system of claim 1, wherein:
the first park brake controller is configured to control a first valve configured to control a supply of air to a park brake of the vehicle; and the second park brake controller is configured to control a second valve configured to control a supply of air to the first valve.

9. The park brake system of claim 1, further comprising:
a first set of pressure sensors coupled with the first park brake controller; and
a second set of pressure sensors coupled with the second park brake controller;
wherein the first and second sets of pressure sensors are along an air flow to one of a tractor park brake and a trailer park brake.

10. The park brake system of claim 9, further comprising an additional set of pressure sensors along an air flow to the other one of the tractor park brake and the trailer park brake.

11. The park brake system of claim 1, wherein the first and second park brake controllers are in a single brake circuit.

12. The park brake system of claim 1, further comprising:
a controller area network (CAN) configured to facilitate electrical communication between the first and second park brake controllers.

13. The park brake system of claim 1, wherein the vehicle is controlled by an automated driving system.

14. A method comprising:
performing in a park brake system of a vehicle comprising first and second park brake controllers:
with the second park brake controller, attempting to park the vehicle in response to detecting of a loss of electronic communication between the first and second park brake controllers; and
with the first park brake controller:
determining whether the second park brake controller was successful in parking the vehicle prior to a first countdown timer elapsing; and
in response to determining that the second park brake controller was not successful in parking the vehicle prior to the first countdown timer elapsing, pneumatically communicating a message to the second park brake controller to indicate that a second countdown timer has started.

15. The method of claim 14, further comprising:
with the first park brake controller:
determining whether the second park brake controller was successful in parking the vehicle prior to the second countdown timer elapsing; and
in response to determining that second park brake controller was not successful in parking the vehicle prior to the second countdown timer elapsing, executing a first park brake controller exhaust control strategy.

16. The method of claim 14, wherein the message is pneumatically communicated by selectively altering air pressure in an air line comprising a pressure sensor coupled with the second park brake controller.

17. The method of claim 14, wherein the first countdown timer is based on a speed of the vehicle.

18. The method of claim 17, wherein the first countdown timer is also based on a time constant.

19. The method of claim 14, further comprising:
detecting the loss of electronic communication by detecting a lack of messages received over a controller area network (CAN).

20. A park brake system comprising:
a first park brake controller;
a second park brake controller; and
means for selectively altering air pressure in an air line of a vehicle to pneumatically communicate a message to the second park brake controller after a loss of electronic communication with the second park brake controller.

\* \* \* \* \*